US007002714B1

(12) United States Patent
Neushul

(10) Patent No.: US 7,002,714 B1
(45) Date of Patent: Feb. 21, 2006

(54) AUTOFEEDER FOR X-RAY SCANNING

(76) Inventor: Stephen Neushul, 20406 Earl St., Torrance, CA (US) 90503

( * ) Notice: Subject to any disclaimer, the term of this patent is extended or adjusted under 35 U.S.C. 154(b) by 942 days.

(21) Appl. No.: 09/715,676

(22) Filed: Nov. 17, 2000

(51) Int. Cl.
*H04N 1/04* (2006.01)

(52) U.S. Cl. ........................ 358/487; 358/506; 355/72; 355/75; 378/34; 378/35; 310/10; 310/12

(58) Field of Classification Search ................ 358/400, 358/401, 448, 474, 497, 487, 506; 378/177, 378/187, 173, 34–35; 355/75–76, 72; 310/10, 310/12

See application file for complete search history.

(56) References Cited

U.S. PATENT DOCUMENTS 3,868,699 A * 2/1975 Gardner et al. ............. 396/555
4,280,691 A * 7/1981 Blum .......................... 271/11
4,920,553 A * 4/1990 Sasaki et al. ............... 378/173
6,077,568 A * 6/2000 Ford et al. .................. 427/512

FOREIGN PATENT DOCUMENTS

JP 09240858 A * 9/1997

* cited by examiner

*Primary Examiner*—Edward Coles
*Assistant Examiner*—Heather D. Gibbs
(74) *Attorney, Agent, or Firm*—Blakely, Sokoloff, Taylor & Zafman, LLP

(57) ABSTRACT

An autofeeder and media object digitization system. A receptacle for media objects is coupled to align a first wall with a clip to hold the media object. A suction device forming part of the first wall sucks a media object against a suction plate. The suction plate then moves the media object into engagement with the clip. The clip is driven to move the media object past a scanning window. A release lever or the clip is triggered to release the media object after it has passed the scanning window.

15 Claims, 4 Drawing Sheets

AUTOFEEDER FOR X-RAY SCANNING

BACKGROUND (1) Field of the Invention

The invention relates to the digitization of media objects such as X-ray films. More specifically, the invention relates to an autofeeder for media objects in a digitizing system.

(2) Background

In recent years there has been a trend for digitizing media objects such as, for example, X-ray films to render the images thereon easily transmissible from remote locations for reading, and also in an effort to reduce storage requirements. Various systems are available for performing this digitization, including the CobraScan® X-ray scanner available from Radiographic Digital Imaging, Inc. of Compton, Calif. That system includes a clip which accepts a single X-ray film and transports it in front of a imaging window through which an image sensing array captures an image of the X-ray film, thereby digitizing the X-ray image. Where large numbers of X-rays are to be digitized, each one must be manually inserted into the clip before initiating the scanning procedure. This labor-intensive system deters the digitization of large existing libraries of X-ray films, and reduces the convenience of, for example, exchanging a patient's medical history between remote sites, where numerous X-rays are involved.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
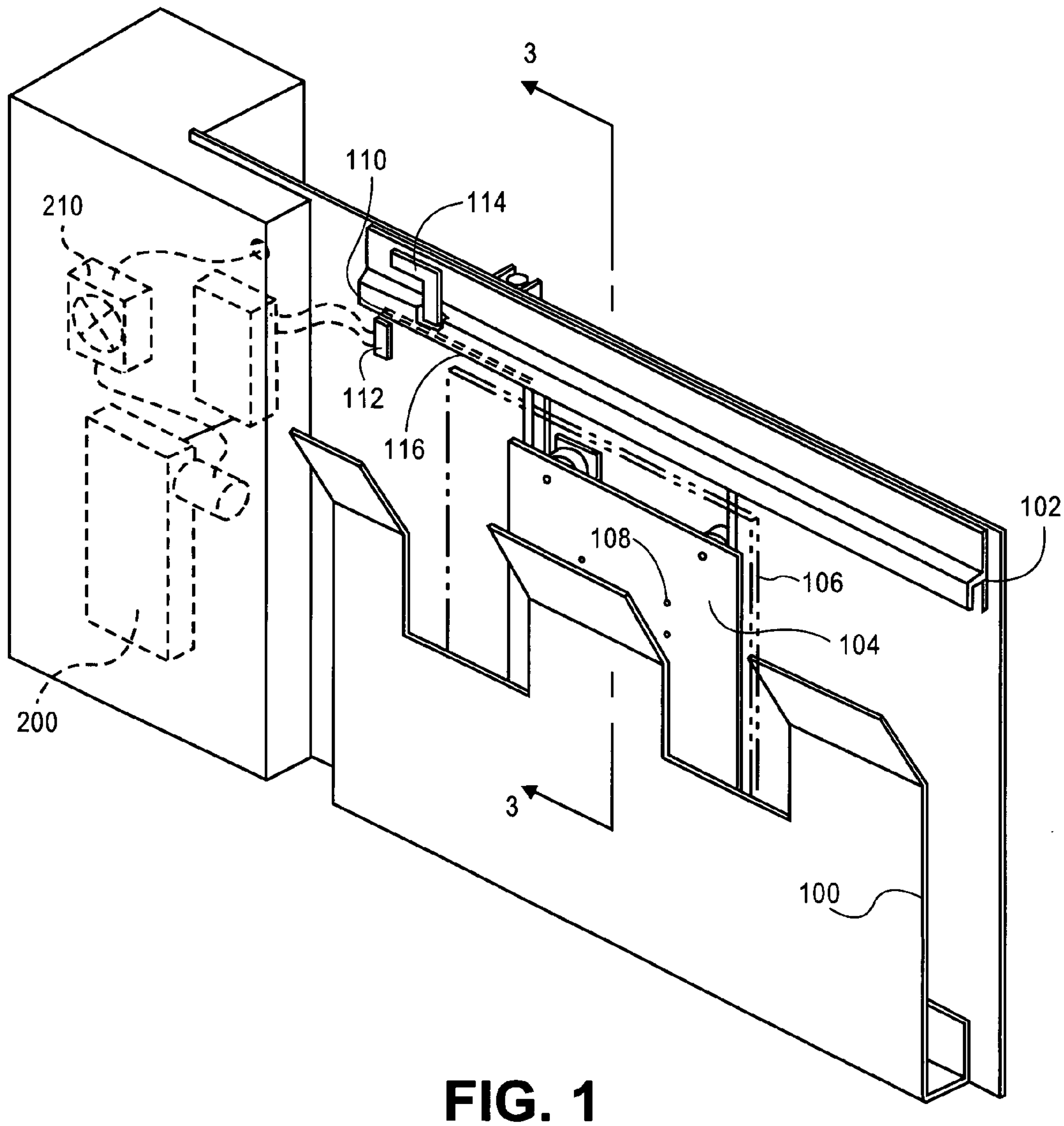
FIG. 1 is a perspective view of an autofeeder of one embodiment of the invention.

FIG. 1 is a perspective view of an autofeeder of one embodiment of the invention. The shown embodiment may be used with the CobraScan® scanner available from Radiographic Digital Imaging, Inc. of Compton, Calif. Such embodiment may be substituted for the light box standard on the CobraScan® unit.

A receptacle 100 is constructed to receive media objects such as X-ray films, or other media types, to be scanned. Exemplary media object 106 is shown in phantom lines. The back surface of the receptacle 100 is partially defined by a suction plate 104 having a plurality of perforations 108 therethrough. As is described below, the suction plate 104 when the suction pump is active sucks adjacent media object 106 against the plate and raises it to be engaged by clip 102.

The suction pump (not shown) is powered when a magnetic switch 112 is activated by magnet 110 when the clip 102 is in the rest position. Insertion of media object 106 into clip 102 causes a rod 116 to rotate, thereby disengaging magnet 110 from the magnetic switch 112, causing the suction pump 200 to shut off. It is also within the scope and contemplation of this invention to use other switching mechanisms including, without limitation, an optical interruptor, a pressure switch, a toggle switch, etc.

When the suction pump 200 shuts off solenoid valve 210 causes the pressure to be quickly released from the suction chamber and the vacuum cylinder (discussed below). The suction plate 104 then disengages from the media object 106. The clip 102 then grasping the media object transports it past the scan window (not shown) so that it can be digitized by a digitizer. Discussion of the general operation of the clip as a transport mechanism can be found in copending application Ser. No. 08/089,311, now U.S. Pat. No. 6,208,437 entitled A VIEWING LIGHT BOX SCANNER FOR SCANNING AND VIEWING TRANSMISSIVE AND REFLECTIVE MEDIA IMAGES. On completion of the scan, a release lever 114 is automatically actuated to release the media object into a bin (not shown). The clip 102 then returns to the rest position to receive a next media object from the receptacle 100.

Figure 2:
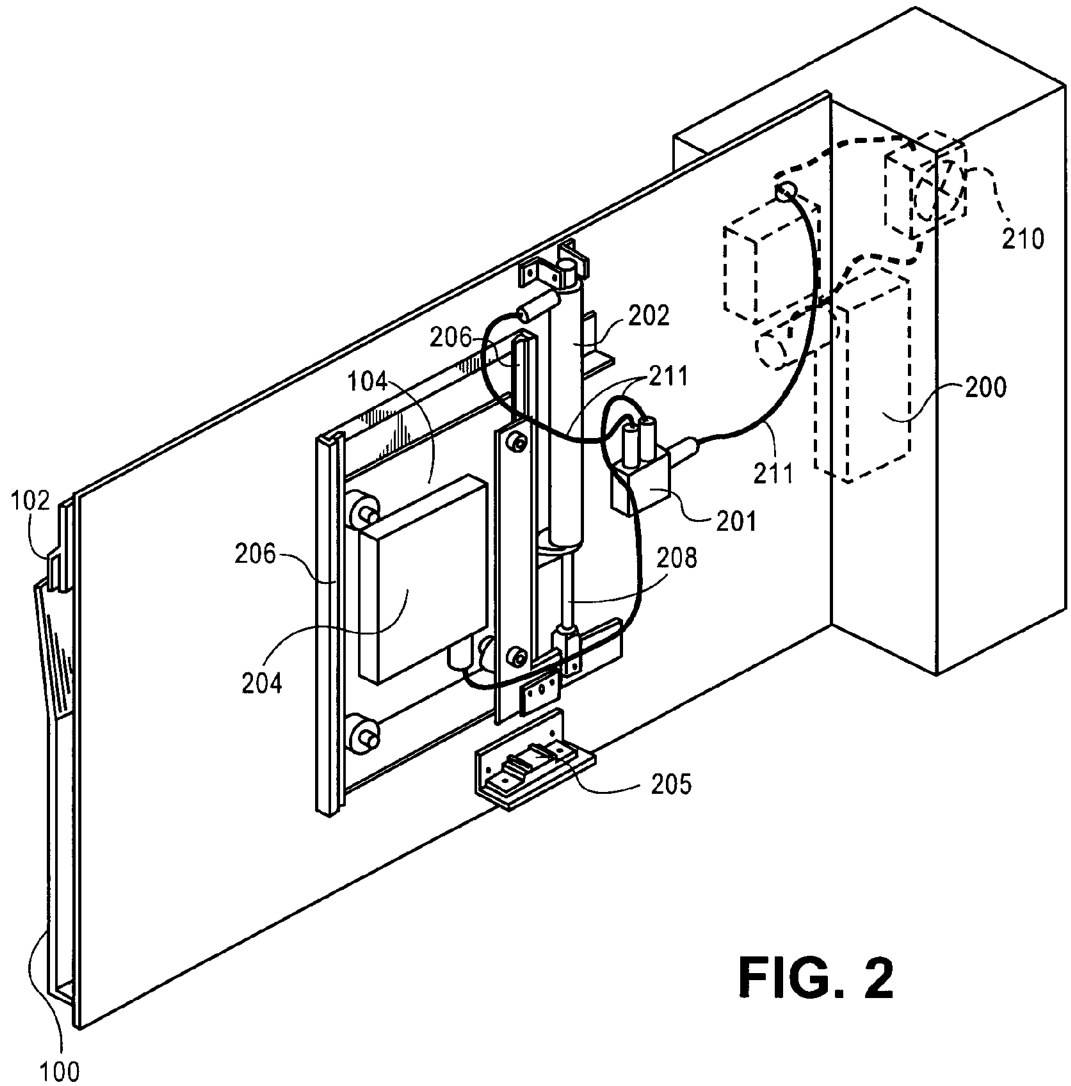
FIG. 2 is a rear perspective view of the autofeeder of FIG. 1.

FIG. 2 is a rear perspective view of the autofeeder of FIG. 1. A suction pump 200 is coupled to a manifold 201 that distributes the suction between a suction chamber 204 and a vacuum cylinder 202. In one embodiment the connections between the pump, manifold, chamber and cylinder is via tubes 211 having quick release connection at each end to facilitate easy setup. The facing side of suction chamber 204, adjacent to the receptacle 100, is suction plate 104. Thus, when the pump 200 is activated by the magnetic switch described above, suction is applied through the perforations to the contents of the receptacle 100. Once the suction engages a media object, the media object prevents further flow of air through the perforations and the suction chamber 204 is evacuated by the suction pump 200. Once this vacuum is created, the vacuum cylinder 202 is also evacuated.

A magnet 205 is magnetically coupled to the suction chamber to restrain the chamber from rising until enough pressure builds up. This helps to insure that the media object 106 is held firmly against the suction plate 104 before movement begins. Once sufficient pressure builds up in the cylinder 202 the magnetic coupling of magnet 205 is broken and piston arm 208 rises up the cylinder 202. The suction chamber 204 resides within tracks 206 and is coupled to the piston arm 208. Accordingly, the suction chamber 204 with media object in tow rises up the tracks 206 until the media object engages the clip, turning the rod 116 and disconnecting the power to the pump. The solenoid valve 210 then promptly releases the pressure within the suction chamber and vacuum cylinder 202, thereby releasing the film and allowing the piston arm 208 and suction chamber 204 to return to the rest position.

Figure 3:
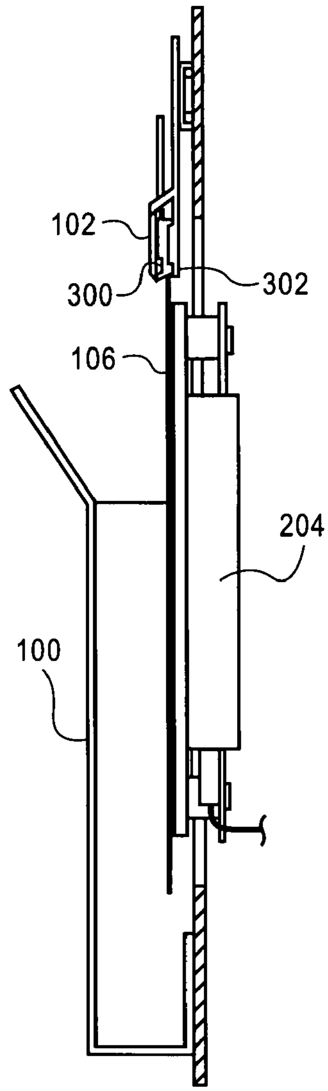
FIG. 3 is a side-sectional view of the autofeeder of FIG. 1.

FIG. 3 is a side-sectional view of the autofeeder of FIG. 1. Suction chamber 204 is almost to the peak of its "up" position, such that media object 106 has been moved from receptacle 100 to just begin to engage jaws 300, 302 or the clip 102.

Figure 4:
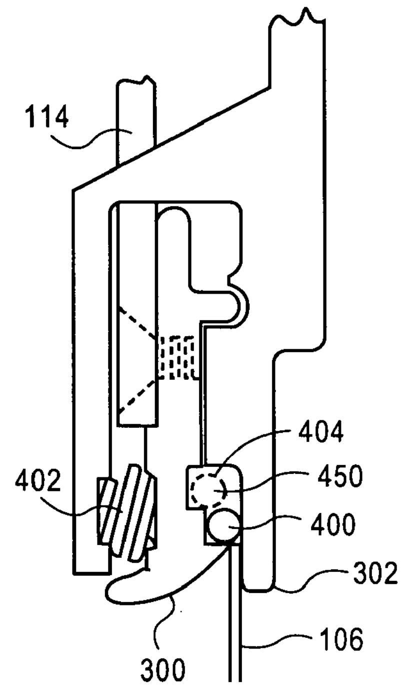
FIG. 4 is an enlarged section view of the clip of the autofeeder of FIG. 1.
Figure 5:
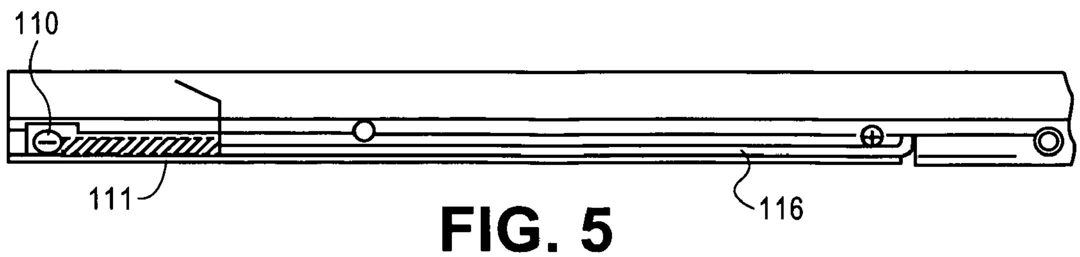
FIG. 5 is a partial view of a portion of the clip of one embodiment of the invention.

FIG. 4 is an enlarged sectional view of clip 102. A roller 400 resides in a cavity between jaw 300 and 302, such that while the roller 400 is in place, jaws 300 and 302 do not close completely. A bias spring 402 is provided to bias jaw 300 into engagement with jaw 302. Upon insertion of a media object 106, the roller 400 is rolled into larger cavity 404 and reside in position 450, such that the jaws 300, 302 hold the media object between them. Lateral pressure on release lever 114 causes jaw 300 to compress bias spring 402, releasing media object 106. At such point, roller 400 will fall under the influence of gravity back between jaw 300 and 302. In this manner, minimal force is required to insert a media object into the clip. Roller 400 may be spherical (or a series of spheres) such as ball bearings. Alternatively, one or more small cylinders may be used. If cylinders are used the cavity 404 must be of appropriate dimension to ensure that the cylinders retain their longitudinal orientation within the cavity 404. FIG. 5 is a partial-sectional view of the clip of one embodiment of the invention. A permanent magnet 110 is attached to rod 116 and biased to be in a particular position by spring 502. When the media object is inserted into the clip, it engages rod 116, turning permanent magnet 110 so as to disengage a magnetic switch (not shown). Once the media object is released from the clip, the bias spring 502 returns the magnet to an engagement position.

Figure 6:
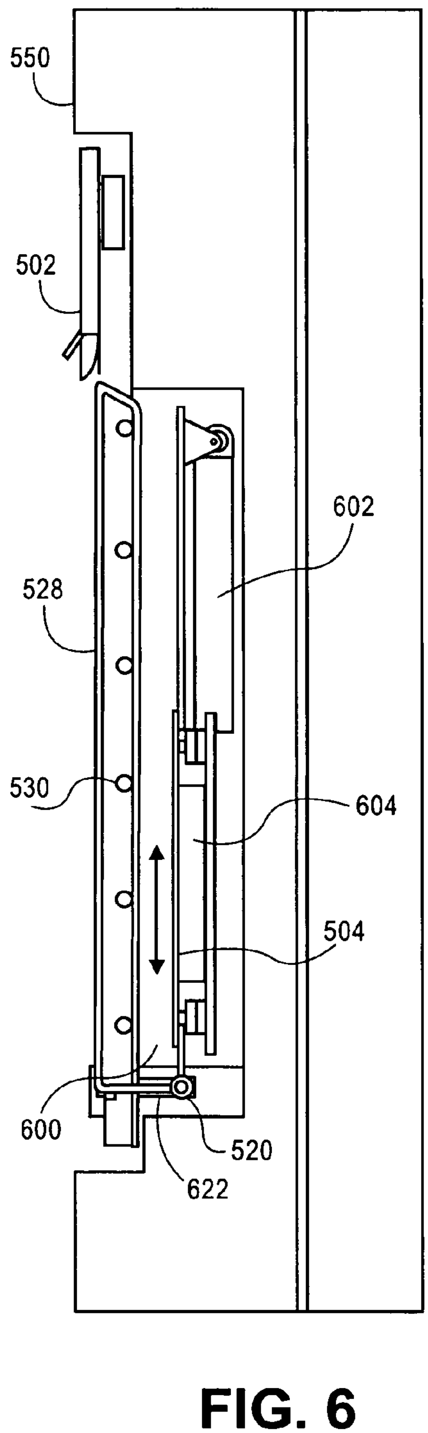
FIG. 6 is a side-sectional view of the scanner autofeeder assembly of one embodiment of the invention.

FIG. 6 is a side sectional view of the scanner autofeeder assembly of one embodiment of the invention. A housing 550 has a clip 502 coupled thereto. Housing 500 also defines the scanning window and contains a digitizer such as a linear CCD or other similar image sensing array. Further description of the digitizer may be found in copending patent application Ser. No. 08/089,311 now U.S. Pat. No. 6,208,437, entitled A VIEWING LIGHT BOX SCANNER FOR SCANNING AND VIEWING TRANSMISSIVE AND REFLECTIVE MEDIA IMAGES, and Ser. No. 09/450,031 now U.S. Pat. No. 6,188,501 entitled AN APPARATUS AND METHOD OF CAPTURING IMAGES FROM ALTERNATIVE MEDIA TYPES AN APPARATUS AND METHOD OF CAPTURING IMAGES FROM ALTERNATIVE MEDIA TYPES. Similarly, clip 502 relies on the same sort of transport mechanism as described in those copending applications. The layout of suction plate 504, suction cavity 604 and vacuum cylinder 602 is substantially as described in connection with FIG. 2 above. A light box is coupled to the housing to form one side of receptacle 600. A translucent plate 528 forms a portion of the external-most surface of the autofeeder assembly. A plurality of light sources are disposed between the translucent plate and the front wall of the receptacle. In one embodiment these light sources are cold cathode lamps, which are available commercially in diameters of three millimeters. Other light sources are within the scope and contemplation of the invention. The light box assembly, as shown in FIG. 6, is oriented to align such that a media object inserted into clip 502 is backlighted by the light box for reading. When positioned thus, the autofeeder is disabled.

Figure 7:
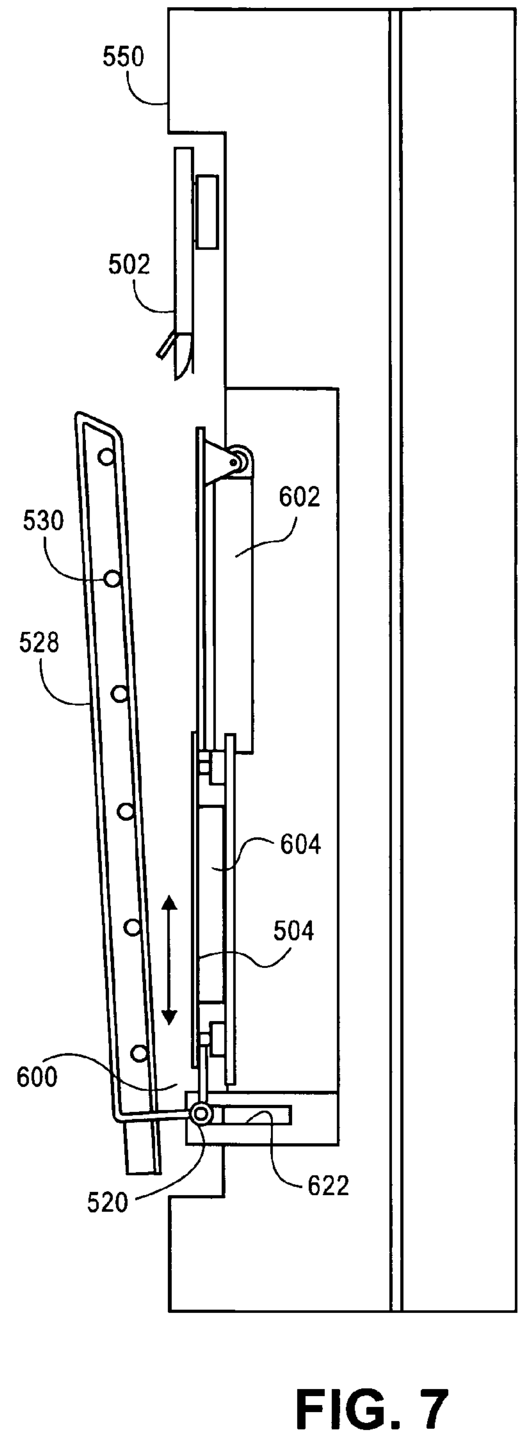
FIG. 7 is a side-sectional view of the autofeeder scanner assembly with the autofeeder in a second orientation.

FIG. 7 shows a side sectional view of the autofeeder scanner assembly with the autofeeder in a second orientation. In this orientation, media objects may be inserted into the receptacle 600 through the top opening. The light box pivots out slightly about piano hinge 520 once the autofeeder light box assembly is first slid along slot 622 to align the suction plate 504 with clip 502. In this configuration, the operation of the autofeeder is substantially as described above.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
- a media receptacle to hold a plurality of media objects;
- a clip to engage and hold a media object;
- a suction device mounted to a side of the media receptacle to engage a first media object within the receptacle and move it to be engaged by the clip; and
- a switch coupled to the clip to cause the suction device to disengage the first media object.

2. The apparatus of claim 1 wherein the suction device comprises:
- a suction chamber having a perforated plate defining at least a portion of one side thereof, the perforated plate also defining a portion of an interior surface of the receptacle; and
- a suction pump coupled to the suction chamber to evacuate the suction chamber thereby exposing the interior of the receptacle to suction through the perforated plate.

3. The apparatus of claim 1 further comprising:
- a light box coupled to the receptacle;
- a housing wherein the receptacle is coupled to the housing to move between a first position and a second position and wherein in the first position the light box is aligned with the clip and in the second position the receptacle is aligned with the clip.

4. The apparatus of claim 3 wherein the light box comprises:
- a translucent plate; and
- a plurality of thin cold cathode lamps.

5. The apparatus of claim 3 wherein in the first position the receptacle is recessed with the housing.

6. The apparatus of claim 1 further comprising:
- a housing defining a scanning window;
- a digitizer mounted within the housing, wherein the clip transports the media object past the scanning window during operation.

7. The apparatus of claim 6 wherein the clip further comprises:
- a release lever to be engaged by the housing after the dip has transported the media object past the scanning window, the release lever causing the clip to release the media object when engaged.

8. An apparatus comprising:
- a receptacle to receive media objects;
- a clip coupled to the receptacle to engage and hold a media object during a digitization process; and
- a suction assembly coupled to the receptacle to move the media object from the receptacle to engagement with the clip.

9. The apparatus of claim 8 wherein the suction assembly comprises:
- a suction plate defining one side of a suction cavity and a portion of a side of the receptacle;
- a vacuum cylinder coupled to the suction cavity to move the suction cavity when a pressure reaches a predetermined threshold; and
- a suction pump in communication with the suction cavity and the vacuum cylinder.

10. The apparatus of claim 8 wherein the clip comprises:
- a pair of jaws defining a cavity;
- a spring biasing the pair of jaws together;
- a roller aligned with the cavity between the jaws to hold the jaws apart wherein insertion of a media object between the jaws causes the roller to move into the cavity such that the jaws close about the media object; and a release to cause the jaws to separate to release the media object and to permit the roller to reseat between the jaws.

11. The apparatus of claim 10 wherein the dip further comprises:

a magnet biased to engage a magnetic switch when a media object is not within the clip and to disengage a magnetic switch once a media object is within the clip, wherein the magnetic switch activates the suction pump.

12. The apparatus of claim 10 wherein the roller is a sphere or a cylinder.

13. The apparatus of claim 8 further comprising:

a light box coupled such that the light box is aligned with the clip when in a first position and the receptacle is aligned with the clip in a second position.

14. The apparatus of claim 9 wherein the suction assembly further comprises a solenoid valve to release pressure in the vacuum cylinder and the suction chamber when the suction pump shuts off.

15. The apparatus of claim 8 further comprising:

a magnet coupled to the receptacle to restrain movement of the receptacle until a force reaches a threshold.

* * * * *

UNITED STATES PATENT AND TRADEMARK OFFICE

CERTIFICATE OF CORRECTION

PATENT NO. : 7,002,714 B1

APPLICATION NO. : 09/715676

DATED : February 21, 2006

INVENTOR(S) : Neushul

It is certified that error appears in the above-identified patent and that said Letters Patent is hereby corrected as shown below:

Column 5: In Claim #11, Line #1, please delete “dip” and insert -- clip --.

Signed and Sealed this

Fourteenth Day of August, 2007

JON W. DUDAS

*Director of the United States Patent and Trademark Office*